Nov. 23, 1965     V. W. COLLINS ETAL     3,218,658
APPARATUS FOR CLEANING BILLETS
Filed Feb. 19, 1964     4 Sheets-Sheet 1
INVENTORS
VARDIE WILLIAM COLLINS,
JOHN BRUNN,
ATTORNEY

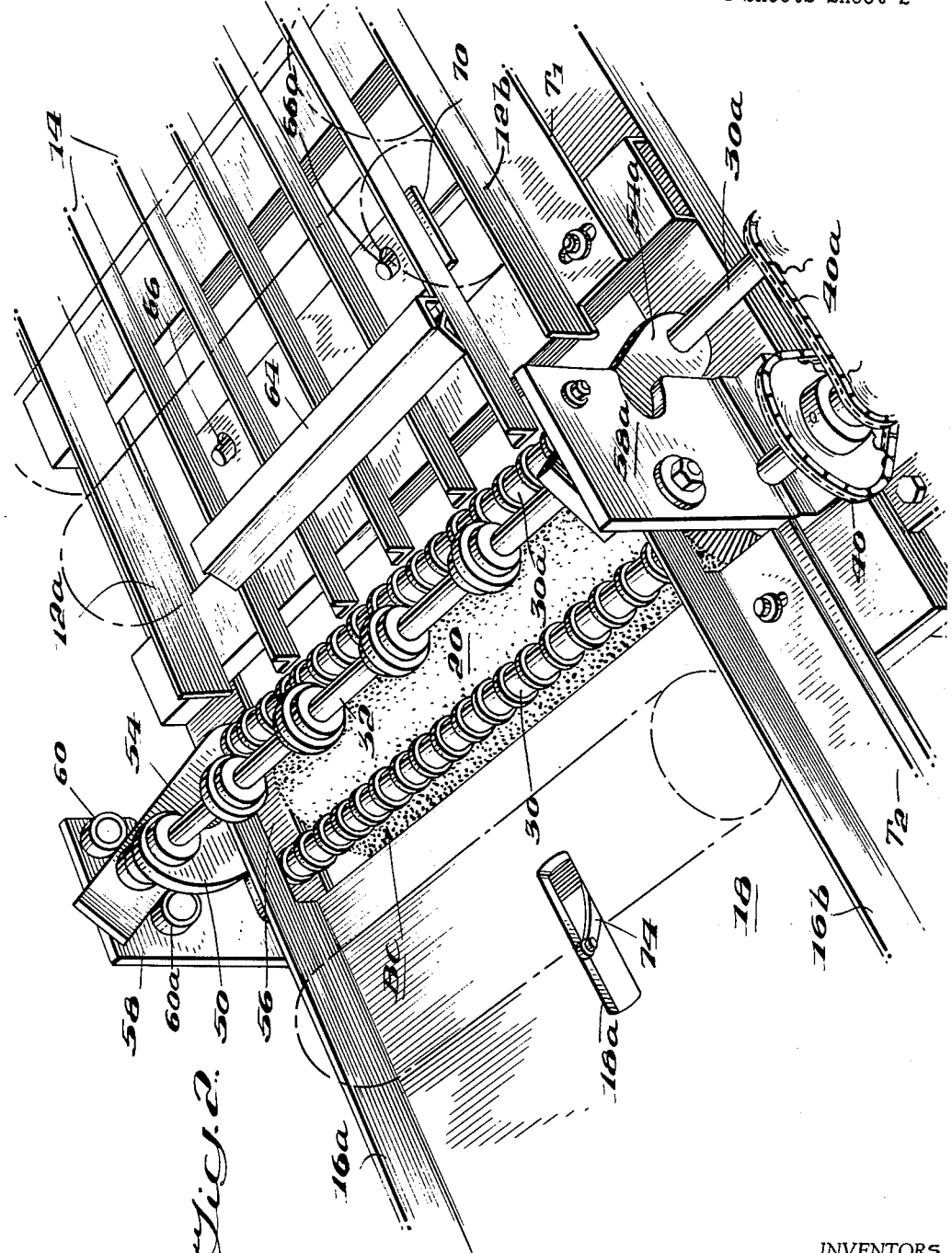

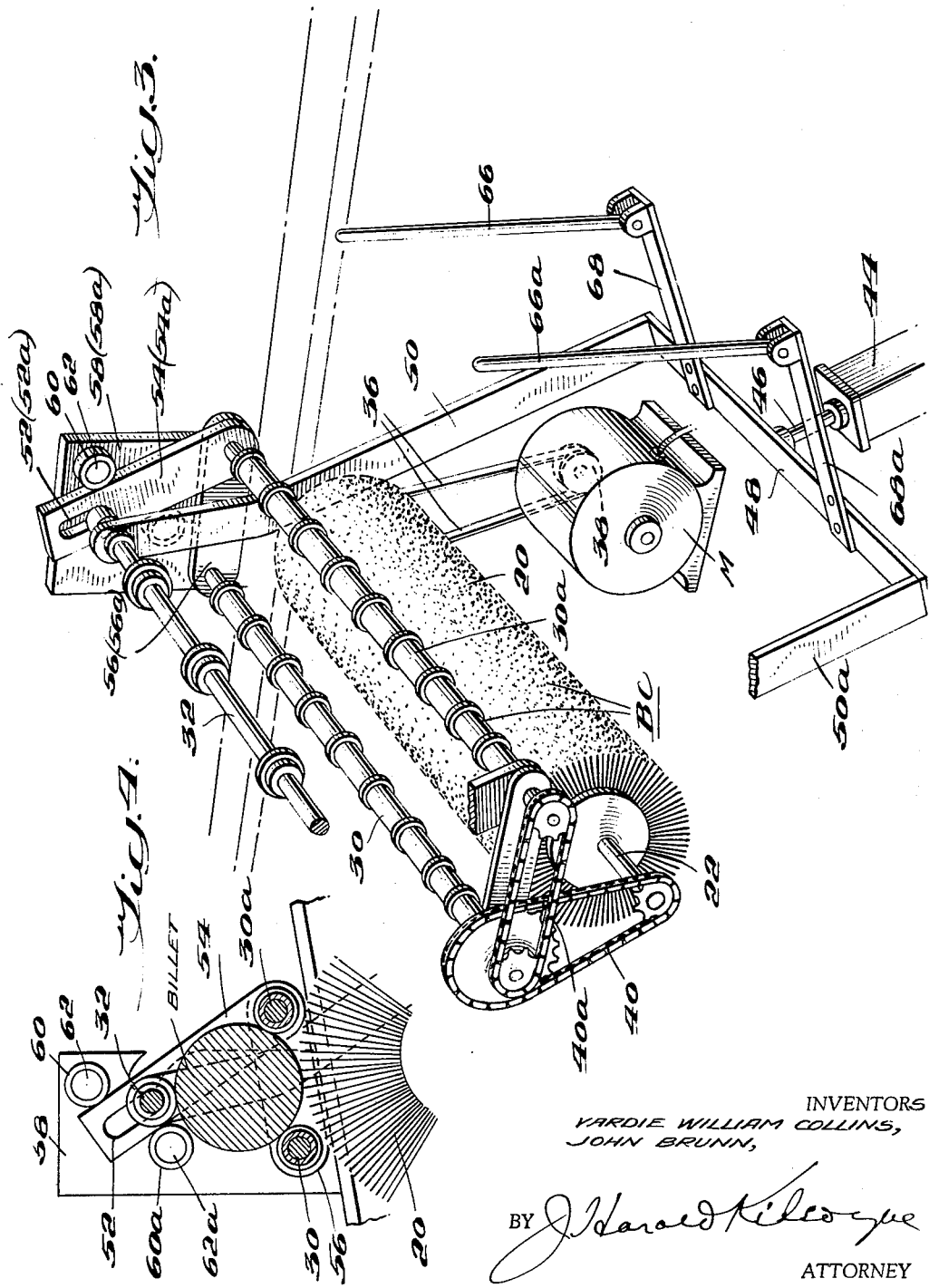

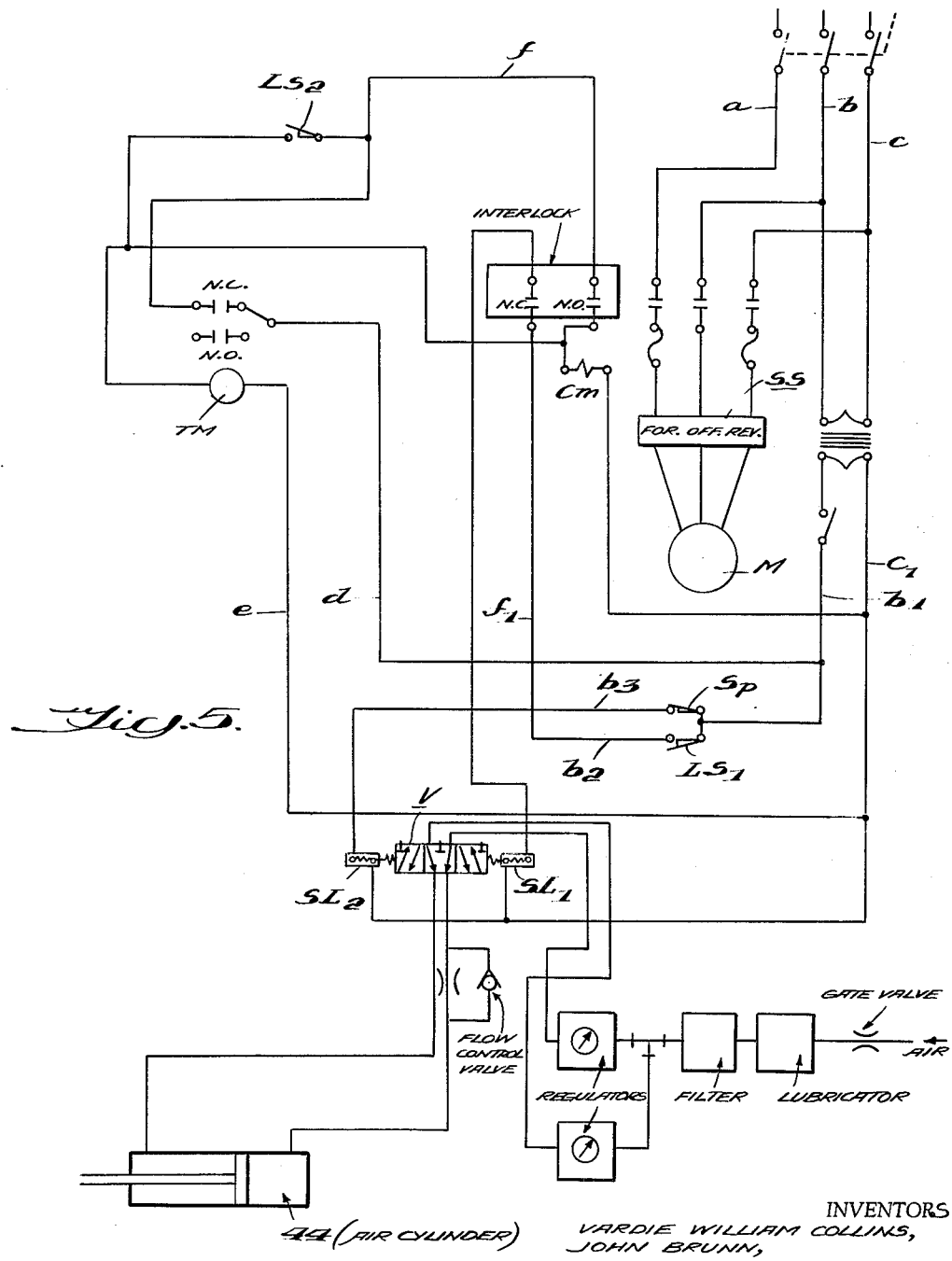

United States Patent Office 3,218,658
Patented Nov. 23, 1965

3,218,658
APPARATUS FOR CLEANING BILLETS
Vardie William Collins, Moreland, and John Brunn, Newnan, Ga., assignors to The William L. Bonnell Company, Inc., Newnan, Ga., a corporation of Georgia
Filed Feb. 19, 1964, Ser. No. 346,030
12 Claims. (Cl. 15—88)

This invention relates to improvements in apparatus for cleaning billets, and more particularly to apparatus for removing the heavy oxides, scale and other foreign matter from the surface of aluminum extrusion billets, i.e., billets of aluminum alloy having cylindrical form as conventionally supplied to extrusion presses which extrude the billets into so-called aluminum shapes.

While it has long been realized that the heavy oxides forming as a surface skin or scale on the surface of aluminum extrusion billets, either alone or together with the hard foreign particles which are usually picked up and become embedded in said surface during the course of casting of the billets, sawing them to the required size and subsequently handling them prior to their being fed to the extrusion press, is a major cause of press die wear and further can impair the finish of the extrusion shapes coming from the press, the only solution for the problem of billet cleaning heretofore advanced was that of subjecting them to a chemical treatment which, while effective to a degree in removing the surface oxides and scale, was wholly ineffective in removing the embedded impurities which understandably are the major cause of die wear.

Broadly stated, the invention contemplates and aims to provide apparatus for thoroughly cleaning by scalping the surface of aluminum extrusion billets which not only mechanizes the cleaning operation, but also effects same in fully automatic manner.

More particularly, an object of the invention is the provision of apparatus for automatically feeding cylindrical aluminum extrusion billets one-by-one to a cleaning or scalping device capable of performing thereon a surface-skin removal or scalping operation, thereupon placing said device in operation as effects cleaning of the billet, and then ejecting the cleaned billet to a stand-by position wherein it is held in readiness to be fed to the extrusion press, such assuming of course that the apparatus is positioned in the billet-feed line to said press.

Another important object of the invention is the provision of automatic billet cleaning apparatus as aforesaid which is so constructed and arranged as to lend itself to being positioned in the billet feed line to an extrusion press and which is readily subject to control either by the press itself or by the operator.

A more particular object of the invention is the provision of a simple, thoroughly dependable, automatic apparatus for removing the oxides, scale and other foreign matter carried by the surface thereof from cylindrical aluminum extrusion billets during the course of their travel down a runway, which may be the runway of a billet feed means to an extrusion press.

Still another object of the invention is the provision of automatic apparatus for performing a surface-cleaning or scalping operation on billets feeding to an extrusion press which is of such effectiveness as results in increased die life, makes for lesser "down time" of the press for die repair, and insures an appreciably improved finish of the aluminum shapes coming from the press.

The above and other objects and advantages of an automatic billet-cleaning apparatus according to the present invention will be set forth or become apparent from the following detailed description thereof, in which reference is had to the accompanying drawings depicting a physical embodiment of the invention which has proved itself in actual practice, wherein:

FIG. 1 is a broken-away side elevation illustrating the general arrangement of the major structural parts and their relationship of an automatic billet-cleaning apparatus according to the invention, the view omitting electrical control and compressed-air supply line features;

FIG. 2 is a broken-away perspective view of the apparatus shown in FIG. 1, looking down onto the cleaning brush and its appurtenances making up the hereinafter referred to "cleaning device" and also showing adjacent end portions of the inclined billet runway means between which said cleaning device is mounted;

FIG. 3 is a diagrammatic view illustrating the general relationships of the companion billet supporting and discharge rollers and the billet hold-down roller with respect to the cleaning brush, the driving means for both the brush and said companion rollers, and the power means for raising both the billet hold-down roller and the billet supporting and discharge roller as effects ejection of a cleaned billet from the cleaning or scalping device onto the lower fall-off or discharge table or section of the runway means;

FIG. 4 is an enlarged sectional view generally illustrating the supporting action of the companion billet supporting rollers and the hold-down action of the billet hold-down roller on a billet disposed in the cleaning device; and FIG. 5 is a schematic circuit diagram illustrating the electrical control and pneumatic features of the invention.

Referring now to the drawings, wherein like reference numerals and/or letters designate like parts through the several views, and particularly to FIGS. 1 and 2, it will be seen that billet-cleaning apparatus according to the present invention generally comprises inclined runway means defined by an elevated upper table section $T_1$ serving as a billet loading table and a longitudinally aligned and also elevated but shorter-length lower table section $T_2$ serving as a billet fall-off or discharge table and whose upper end is spaced from the lower end of the table $T_1$, and a billet cleaning device herein designated BC disposed in the space between said sections.

Preferably, the upper billet-loading table $T_1$ is of simple angle-iron construction, being comprised by side pairs of front and rear vertical legs 10a, 10b making up a leg structure or framework which supports longitudinally extending, transversely spaced L-angles 12a, 12b whose vertical flanges face one another so that they define the side boundaries of the billet runway, the bottom of which is defined by the upper edges of smaller L-angles 14 which extend the length of the table and are disposed intermediate the larger side angles 12a, 12b thus to form a grid-like runway bottom or floor. The aforesaid leg structure 10a, 10b may also provide the leg structure for the fall-off table $T_2$ forming the lower section of the runway and which is shown to be defined by side L-angles 16a, 16b comparing to the aforesaid L-angles 12a, 12b of the table $T_1$ and by a runway bottom preferably comprised by a smooth-surfaced plate 18.

It will be further understood that the width of the runway provided by the inclined tables $T_1$ and $T_2$ corresponds generally to the axial length of the billets to be cleaned and that the slope of said runway is such that said billets which are conventionally of cylindrical configuration may roll down same by gravity, when they are free so to do.

Referring to FIGS. 2, 3 and 4, the billet-cleaning device BC, including its appurtenances, comprises a positively driven cylindrical stiff-wire brush 20 arranged with its axis (as defined by a through shaft 22) disposed horizontally and transversely of the billet runway. Illustratively, and as will be seen in FIG. 1, such shaft 22 has its end journaled in bearings enclosed in bearing stands 24 carried by and affixed to side angles 26 which extend between the front and rear legs 10a, 10b of the aforesaid table structure.

Said cleaning device also includes a companion pair of positively driven, transversely disposed, billet-supporting rollers 30, 30a, of which the more forward or discharge-side roller 30 turns on a fixed axis and the more rearward roller 30a turns on an axis which is bodily movable in upward-forward direction so that it is capable of functioning also as a billet-discharge roller. Hence, said roller 30a will be hereinafter termed as the supporting and discharge roller, whereas said roller 30 will be referred to simply as the supporting roller.

Also included in the billet-cleaning device BC is a non-powered but freely rotatable billet hold-down roller 32 which extends transversely across the apparatus and has a normal position in which its axis is disposed substantially in the vertical plane containing the axis of the brush shaft 20 and at a level such as to exert hold-down pressure on a billet supported on the aforesaid companion rollers 30, 30a. At this point, it will be explained that it is intended that in its cleaning position a billet will be supported on the supporting rollers 30, 30a, in the manner generally illustrated in FIG. 4, and accordingly said rollers are normally disposed in the same horizontal plane and are spaced apart a distance such that a billet supported thereon will be engaged along the lower arc of its periphery by the ends of the stiff wires making up the upper arcuate portion of the cylindrical body of the aforesaid brush 20.

Although the aforesaid parts 30, 30a and 32 have been referred to and will be referred to throughout as rollers, it will be understood that such parts are actually more in the nature of shafts carrying boss-like enlargements at spaced intervals along their respective lengths, the peripheral surfaces of which are machined and/or surfaced so as to provide, in the case of the rollers 30, 30a frictional drive surfaces, and in the case of the hold-down roller 32, hardened wear surfaces.

As best shown in FIGS. 1 and 3, the cylindrical stiff-wire cleaning brush 20 is power-driven directly from an electric motor M disposed generally below said brush and preferably accommodated within the leg supporting structure provided by the pairs of legs 10a, 10b by means of a driving belt 36 extending between a pulley 38 mounted on the motor shaft and a corresponding driven pulley (not shown) mounted on the far end of the brush shaft 22 as the latter is viewed in FIG. 3. The companion billet supporting and supporting-discharge rollers 30, 30a are also power-driven, but preferably at a reduced speed as compared to that of the brush 20, by means of power take-offs designated 40, 40a (FIG. 3) from said brush shaft 22. Preferably, such power take-offs are of the chain-and-sprocket type, as this type is especially suited to drive the supporting and discharge roller 30a which, as previously stated, is adapted to be bodily moved forwardly-upwardly from its normal position in which it is shown in FIGS. 3 and 4.

According to the invention, positive elevating-swinging and straight elevating motion is imparted to the billet supporting and discharge roller 30a and to the billet hold-down roller 32, respectively, by power means presently to be described, and said means is also employed to apply a positive hold-down force on the hold-down roller 32 as insures that the billet then being cleaned is forcefully held in engagement with the cleaning brush 20. However, before describing such means, it is explained that in the intended operation of the cleaning device BC cleaning or scalping of a billet supported in cradled position on the companion rollers 30, 30a above the rotating brush 20 is effectively assisted by applying a hold-down pressure on the billet, as insures not only that its outer peripheral surface shall be positively engaged by the ends of the stiff wire bristles making up said brush 20 but also that the billet being cleaned shall be positively held against the friction-surfaced supporting rollers 30, 30a which are power-driven as earlier described, and thereby progressively rotated about its axis as the cleaning operation proceeds. Moreover, this intended operation further contemplates that after completion of the cleaning operation, which terminates when the brush driving motor M is deenergized through a timing mechanism connected in its control circuit, the cleaned billet is thereupon ejected from the cleaning device BC by being positively rolled forwardly therefrom onto the fall-off or discharge table $T_2$. It now becomes obvious that for this discharge operation to be successful it is necessary, not only to first release the hold-down roller 32 and thereupon to elevate it to a position in which it will not interfere with the ejecting movement of the cleaned billet, but also to actuate the supporting discharge roller 30a in upward-forward direction by an amount such that the cleaned billet will be rolled forwardly over the companion fixed-axis supporting roller 30, and thence onto said fall-off or discharge table $T_2$. Hence, this operation requires both a power means and force transmitting connections between said power means and each of the hold-down roller 32 and the supporting and discharge roller 30a, as will effect the requisite motion of said rollers when cleaning has been finished and discharge of the cleaned billet is desired.

Referring particularly to FIG. 3, such illustrates that the power means includes an air cylinder 44 mounted within the leg structure of the apparatus so as to extend in upwardly-forward direction and also that said force-transmitting connection between said power means and said hold-down roller 32 includes a transversely extending cross head 48 affixed to the piston rod 46 of said air cylinder and, connected to the outer ends of said cross head, a pair of upwardly-forwardly extending arms 50, 50a in whose upper ends the ends of the hold-down roller 32 are journaled. Accordingly, motion and position of the hold-down roller 32 in elevation is directly responsive to travel and position of the piston within the air cylinder 44.

Powered raising movement of the cross head 48 and pair of arms 50, 50a is also utilized to effect delayed raising of the supporting and discharge roller 30a by way of lost motion linkage connection between said roller and the aforesaid hold-down roller 32. More particularly, the ends of the hold-down roller 32 are extended beyond the upper ends of the pair of arms 50, 50a in which they are journaled as aforesaid by an amount such that they project into short-length, substantially vertical slots 52, 52a provided in the upper end portions of links 54, 54a, which latter are hung from the ends of the hold-down roller 32 so that they depend downwardly therefrom to the supporting and discharge roller 30a. The ends of said roller are extended and project through apertures provided in the lower ends of said hang links 54, 54a, and thence through the corresponding apertures in the relatively rearward ends of swing arms 56, 56a. Thus, said roller ends are journaled in said swing arms and further provide a pivotal connection between the lower ends of the hang links and the rearward ends of said swing arms.

The outer ends of the more forward supporting roller 30, which as explained in the foregoing is a fixed axis roller, are extended through apertures in the forward ends of said swing arms 56, 56a, and thus the latter may swing about the axis of the supporting roller 30 in response to the hang links 54, 54a being bodily raised as by movement of the air piston-actuated cross head 48 in upward direction.

Although not shown in detail, the arrangement is one in which the outer ends of the fixed axis supporting roller 30 are journaled in stationary upright side plates 58, 58a extending between the sections or tables $T_1$ and $T_2$, which latter serve as guards for the hang links 54, 54a and swing arms 56, 56a, both of which operate in vertical planes disposed inwardly of and in close adjacency to the vertical planes containing said upright side plates 58, 58a.

With the construction so far described, it will be understood that when pressure air is admitted to the air cylinder 44, the cross-head carried arms 50, 50a are forcibly projected in upward direction. During the initial portion of this movement, the hold-down roller 32 is actuated in upward direction independently of any corresponding upward motion being imparted to the supporting and discharge roller 30a, consequent to the ends of the hold-down roller traveling the length of the slots 52, 52a of the links 54, 54a before imparting corresponding upward movement to said links. However, upon the ends of the hold-down roller moving against the upper ends of said slots 52, 52a, continued raising movement of the piston-actuated arms 50, 50a results not only in further upward movement of the hold-down roller 32, but also in unison therewith, upward movement of the supporting and discharge roller 30a. Consequent to the ends of the latter roller being connected to the outer ends of the swing arms 56, 56a and thereby constrained to move in the arcuate path of movement of said ends, the movement of said roller 30a is both upwardly and forwardly. By proper design of the linkage connections extending to the rollers 30a and 32 as aforesaid, the upward-forward motion of the roller 30a can readily be made that rendering said roller 30a capable of moving the now cleaned billet in forward direction over the companion supporting roller 30, as effects ejection of said billet from the cleaning device CD. By design, the raising movement of the hold-down roller 32 is also such as ensures its being elevated not only to an inactive position but also to a non-interfering position as respects the cleaned billet moving forwardly over the roller 30. Thus, upon the air cylinder piston reaching the end of its upward or working stroke, an already cleaned billet previously will have been forcefully ejected therefrom.

It being a feature of the invention that the hold-down roller 32 will exert a positive hold-down force on the billet as the latter is being worked upon by the wire brush 20, it is also contemplated that the parts will be so arranged, related and dimensioned as to provide that the full air pressure of the air cylinder 40 will be exerted on the hold-down roller 32, thereby in turn to the billet being cleaned. Such in practical effect means that when the hold-down roller and billet are in their respective positions shown in FIG. 4, full air pressure is being supplied to the upper end of the air cylinder 44.

Preferably, means are provided to positively guide each of the hang links 54, 54a throughout its raising and lowering movement imparted to it as aforesaid. A simple link-guidance means is shown in FIGS. 3 and 4 to comprise a pair of appropriately spaced guide rollers 60, 60a turning on pins 62, 62a affixed to and projecting inwardly from the inner side of each of the aforesaid upright guard plates 58, 58a. By suitable positioning of these guide rollers, movement of the links 54, 54a may be simply yet effectively both guided and controlled.

It is a further feature of the invention that the endmost (lowermost) uncleaned billet of a supply thereof previously loaded onto the loading table T₁ and positioned thereon with their axes disposed transversely of the runway is automatically fed to the cleaning device BC immediately following ejection of a cleaned billet from said cleaning device as just described. Normally, the uncleaned billets are held from rolling to the cleaning device by a transverse hold-back bar 64 (FIG. 2) affixed to the L-angles 14 making up the floor of the billet runway provided by the loading table T₁ and which is preferably located well towards the cleaning-device end of said runway. To release the lowermost billet from the aforesaid supply line thereof as permits it to roll by gravity to the cleaning device, there is provided a pair of generally upright feed rods 66, 66a whose lower ends are pivotally connected to the rearward free ends of bracket arms 68, 68a affixed to the aforesaid air-cylinder actuated cross head 48 and whose upper ends project through apertures provided therefor in a feed rod guide plate 70 also affixed to the billet runway of loading table T₁ and which position the upper ends of said feed rods rearwardly or upstream from the billet hold-back bar 54 a distance somewhat less than the diameter of the billets being fed to the press. Further, the length of the feed rods 66, 66a is such that in the lowermost position of the piston operating in the air cylinder 44 and the corresponding lowermost position of the cross head 48, the upper ends of the feed rods do not project above the bottom line of the billet runway, so that the feed rods are normally inactive. However, upon the cross head 48 being projected upwardly throughout its working stroke, the upper ends of the feed rods 66, 66a are forcibly projected upwardly through the runway bottom or floor by an amount such that they forcibly engage the lowermost billet of the line thereof at spaced points along the length of said billet which are disposed on the upper side of its line of contact with said runway floor, as effects lifting of the billet to a position enabling it to roll over the hold-back bar 64, which it proceeds to do. Upon clearing the hold-back bar, said lowermost billet then rolls by gravity onto the billet supporting rollers 30, 30a of the cleaning device BC. Subsequently lowering of the feed rods 66, 66a permits the next lowermost billet B to roll downwardly to the hold-back bar 64 which holds the supply line of billets in readiness for the next feed-in operation.

Upon its ejection from the billet-cleaning device, each cleaned billet rolls down the billet runway of the fall-off or discharge table T₂ until stopped by a retractible hold-back or stop arm 74 whose normal or active position is such that it projects upwardly through an opening 18a in the runway floor 18 of said table T₂ a distance enabling it to function as a billet stop. However, said hold-back arm 74 is mounted for retracting movement to an inactive position, whereupon the cleaned billet is free to roll past same to the extrusion-press loading mechanism (not shown), which of course assumes that the billet cleaning apparatus of the invention is mounted in the feed line to such a press.

At this point in the description, it is thought that a general statement of the contemplated cycle of operation of the automatic billet-cleaning apparatus of the invention will be helpful, not only to a proper understanding of the apparatus considered as such but also of the control means therefor to be described. Accordingly, it is explained that upon the start of each cycle of operation of the instant apparatus, a cleaned billet is in a so-called stand-by position on the table T₂ in which it is held by the retractible hold-back arm 74; the next following billet already cleaned is supported on the supporting and supporting-discharge rollers 30, 30a of the billet-cleaning device BC; and a line of billets to be cleaned are disposed on the loading table T₁ whereon they are held against rolling downwardly forwardly to the cleaning device by the hold-back bar 64. Upon either the press operator or the press-loading mechanism itself calling for a billet, the hold-back arm 74 is momentarily retracted, thus allowing the cleaned billet to roll from the table T₂ to the press. When said billet has been received by the press, the hold-back arm is permitted to return to its normal active position and during this return movement it actuates a limit switch which in turn activates an air solenoid which causes a charge of pressure air to be supplied to the rear or under end of the air cylinder 44, thereby raising the cross head 48. As said cross head 48 partakes of its raising movement, it effects in the first instance elevation of the hold-down roller 32 and then raising and forward swinging movement of the billet supporting and discharge roller 30a of the cleaning device, such effecting ejection of the already cleaned billet then in the cleaning device, whereupon said billet rolls down the runway of table $T_2$ until stopped by the retractible hold-back arm which by this time in the cycle has returned to its raised or active position. As the cross head moves upwardly, it also actuates feed rods 66, 66a in upward direction resulting in the lower uncleaned billet of the supply line thereof being pushed forwardly over the hold-back bar 64 of table $T_1$ whereupon said billet rolls down the inclined roll-way to the cleaning device BC. It will be understood that due to the time lag built into the operation of the feed rods 66, 66a, the supporting and discharge roller 30a will have lowered to its normal billet-supporting position by the time that the rolling billet reaches the cleaning device.

Just prior to the cross head 48 of the power means reaching the end of its upward travel, it strikes and closes a second limit switch, the closing of which causes a reversal of the aforesaid air solenoid valve as in turn results in a charge of pressure air being supplied to the front or upper end of the air cylinder. Such effects lowering of the cross head as in turn causes lowering of the billet supporting and discharge roller 30a, of the hold-down roller and of the feed rods 66a, 66b, and it further effects closing of the circuit of the brush motor M. Such operations by design occur in properly timed sequence as insures that the cleaning device is full open and hence conditioned to receive said next billet when the latter rolls into same; that immediately prior to said next billet reaching the cleaning device the supporting and discharge roller 30a will have lowered to its normal billet-supporting position and that the hold-down roller will lower onto the said billet immediately after it has been fully received in the cleaning device; that the cylindrical cleaning brush will begin rotation prior to the hold-down roller 32 lowering against the so received billet; and that retraction of the feed rods 66, 66a takes place at the proper instant as allows a controlled rolling of the billets on the feed table $T_1$ against the hold-back bar 64.

Upon the cleaning brush 20 being placed in operation, it stays in operation for a predetermined time which is sufficient for the brush to clean the billet freshly fed to the cleaning device, whereupon the cycle terminates, with all parts conditioned for initiation of the next following cycle.

Billet-cleaning apparatus as described has the advantage of being capable of effective electrical control. A simple control circuit suitable to the apparatus is illustrated in FIG. 5, wherein the motor M for driving the cylindrical stiff-wire cleaning brush 20 is shown to be supplied through supply mains $a$, $b$ or $c$, $b$, depending on the setting of the "forward-off reverse" switch SS. Pressure air to the air cylinder 44 is under the control of a four-way double-solenoid actuated, spring centered valve V. The solenoid $SL_1$ incorporated in said valve is energized by current from the aforesaid mains $b$, $c$ through the supply circuit $b_1$, $b_2$ and $c_1$ when the normally open limit switch $LS_1$ (associated with the aforesaid stop arm 74) is allowed to close, which condition occurs whenever a cleaned or scalped billet has been received by the press loading mechanism, and when so energized the valve V is actuated to a position in which it admits pressure air to the under side of the piston of the air cylinder 44. At this point it is explained that the other valve actuating solenoid $SL_2$ is energized through circuit $b_1$, $b_3$ and $c_1$ which is controlled by the normally closed switch $S_p$ paired with but acting oppositely from said limit switch $LS_1$, and that accordingly the valve V is normally held in a position in which it admits pressure air to the upper side of said piston. However, closing of the aforesaid limit switch $LS_1$ as aforesaid effects reversal of said valve V and thereby in ejection of the cleaned billet from the cleaning device BC and also in raising of the feed rods 66, 66a as pushes the lowermost billet on the table $T_1$ over the hold-back bar 64, whereupon it rolls downwardly to the cleaning device, all as previously described.

Just prior to the cross head 48 reaching the end of its upward stroke, it engages a second, normally open limit switch $LS_2$ and momentarily closes same. When closed, said switch $LS_2$ completes both the circuits $b_1$, $d$, $e$, $c_1$, in which is connected a timer motor TM, and the parallel circuit $b_1$, $d$, $f$, $f_1$, $c_1$ of a motor starting coil $C_m$. Upon the latter being energized, the motor M and thereby the brush 20 is placed in operation for a predetermined period of time calculated to be that enabling the wire brush to perform an effective cleaning or scalping action upon the billet then in the cleaning device. Upon the set cleaning time having elaspsed, the circuit of the timer motor TM opens automatically and rotation of the wire brush stops. Thereupon, since both switches $LS_1$ and $LS_2$ have already returned to their respective normally open positions and the switch $S_p$ to its normally closed position, the operating cycle of the apparatus terminates, but with both the apparatus itself and the control circuit conditioned for the next succeeding call by the press-loading mechanism or by the press operator for a clean billet.

In connection with the "forward-off-reverse" switch SS, such provides for the motor M being selectively driven in either forward or reverse direction, and thereby for rotation of the stiff wire brush being periodically reversed. Such reversal is of advantage as it renders the brush self-cleaning, which makes for longer useful life of the brush. Although not shown, means for bodily raising or lowering the brush to provide for a desired initial setting thereof, and thereafter to compensate for brush wear, may be incorporated into the apparatus.

FIG. 1 illustrates another accessory feature that may be advantageously incorporated into the herein apparatus, such comprising a cleanings, i.e. removed scale, oxide particles, etc. collecting receptacle 80 and a discharge chute 82 therefrom. The receptacle 80 will enclose the cylindrical brush on all but its upper side and since the cleanings will be thrown tangentially from the upper line of said brush, they will be largely received in said receptacle by dropping thereinto after impinging the front or rear vertical walls of said receptacle proper, depending on the direction of brush rotation.

As many changes could be made in carrying out the above constructions without departing from the scope of the invention, it is intended that all matter contained in the above description or shown in the accompanying drawings shall be interpreted as illustrative and not in a limiting sense.

What is claimed is:

1. Cylindrical billet cleaning apparatus comprising, in combination: inclined runway means divided into an upper section for the billets to be cleaned and a lower section for the cleaned billets, said sections being longitudinally spaced from one another; billet cleaning means operative in the space between said sections and including a cylindrical cleaning element mounted for rotation about a fixed axis extending transversely across and at a lower level than the runway means, means for positively driving said cleaning element, and means disposed above said cleaning element for supporting a billet to be cleaned rolling thereto from the upper section of the runway means in a position such that its peripheral surface is engaged and acted upon by the peripheral surface of the cleaning element; and means for ejecting a billet already acted upon by the cleaning element from the cleaning means onto the lower section of the runway means for rolling movement therealong and for freeing a billet to be cleaned disposed on the upper section of said runway means for rolling movement to said cleaning means.

2. Cylindrical billet cleaning apparatus according to claim 1, wherein said cleaning element comprises a cylindrical, stiff wire brush.

3. Cylindrical billet cleaning apparatus according to claim 2, wherein the means for positively driving said brush is selectively operable to drive the brush in either direction of rotation.

4. Cylindrical billet cleaning apparatus according to claim 1, wherein said billet supporting means comprises a pair of rollers rotatable about axes which extend parallel to that of the cleaning element and are spaced apart and disposed at a level such as to support the billet to be cleaned above and with the bottom arc of its peripheral surface in engagement with the upper arc of the peripheral surface of said cleaning element.

5. Cylindrical billet cleaning apparatus according to claim 4, including means for driving the billet supporting rollers at a slower speed than that at which the cleaning element is driven.

6. Cylindrical billet cleaning apparatus according to claim 1, wherein said billet supporting means is so positioned as to support a billet above the cleaning element, and wherein said apparatus includes means for imparting a hold-down force on the billet of magnitude as insures its being effectively acted upon by said cleaning element.

7. Cylindrical billet cleaning apparatus according to claim 1, and further including hold-back means on the upper section of the runway means for holding a billet or a series of billets disposed thereon from rolling downwardly to the cleaning means, hold-back means on the lower section of the runway means for holding a cleaned billet rolling thereonto from the cleaning means from rolling off the lower end of said section, and means for rendering both said hold-back means inactive and for rendering said billet ejecting means active in predetermined sequence.

8. In cylindrical billet cleaning apparatus of the character described, the combination comprising: a cylindrical, stiff-wire cleaning brush disposed with its axis extending across a path of billet flow; means for rotating said brush; means for supporting a billet in position to be acted upon by said brush including powered, spaced-apart rollers disposed with their axes in parallel with the axis of the brush and normally positioned at a level as to support a billet in position such that it is engaged along the lower arc of its periphery by the upper arcuate portion of the brush; means for driving said rollers at a speed less than that of the cylindrical brush thereby to effect rotation of the billet relative to said brush; a billet hold-down roller disposed generally above said supporting rollers and with its axis in parallelism with that of said brush and at a level such that it is effective to apply a hold-down force on a billet supported on said supporting rollers; and power means for ejecting a cleaned billet from a supported position as aforesaid including means for elevating said hold-down roller to an inactive position as permits forward movement of said cleaned billet from under same, and means for bodily moving the more rearward of said two supporting rollers in upward-forward direction and by an amount such that during the course of such movement it pushes the cleaned billet upwardly-forwardly over the more forward of said supporting rollers.

9. The combination according to claim 8, further including a connecting between said power means and said hold-down roller for normally transmitting a downward force from said power means to said roller and thereby a positive hold-down force to a billet supported on said supporting means.

10. The combination according to claim 8, wherein said power means includes an air cylinder and its piston and mechanical connections operative between said piston and each of said hold-down roller and said more rearward supporting roller for actuating said rollers as aforesaid responsive to travel of said piston in one direction.

11. The combination according to claim 10, wherein said connections include lost-motion means operative in the connection to said rearward supporting roller for insuring that movement of said hold-down roller to its elevated position is initiated prior to upward-forward movement of said rearward supporting roller being initiated.

12. Cylindrical billet cleaning apparatus comprising, in combination: inclined runway means comprising an upper section for the billets to be cleaned and longitudinally spaced therefrom a lower section for the cleaned billets; a billet cleaning device disposed in the space between said sections and including a cylindrical cleaning element disposed with its axis extending transversely across said runway means, roller means for supporting a billet to be cleaned in position to be acted upon by said cleaning element, and an electric motor for driving said cleaning element; hold-back means on the upper section of the runway means for preventing a series of cylindrical billets to be cleaned from rolling downwardly thereon to said cleaning device; retractible hold-back means on the lower section of the runway means for maintaining a cleaned billet rolling thereto from the cleaning means in a stand-by position ready for use; means for ejecting a cleaned billet from the cleaning device to the lower section of the runway means for rolling movement thereon to said retractible hold-back means and substantially simultaneously therewith for freeing the lowermost billet of the series thereof on said upper section of the runway means for rolling movement to said cleaning device; and electrical control means responsive to a call for the cleaned billet in the stand-by position to effect (1) temporary retraction of said retractible hold-back means, (2) actuation of said cleaned billet ejecting means and said billet-freeing means, and (3) energization of said electric motor for a predetermined period of time calculated to be that required for cleaning of the freed billet rolling to the cleaning device.

References Cited by the Examiner

UNITED STATES PATENTS

| 2,819,563 | 1/1958 | Lowe | 51—215 X |
| 2,979,196 | 4/1961 | Harmon | 15—70 X |

FOREIGN PATENTS 588,536   5/1947   Great Britain.

CHARLES A. WILLMUTH, *Primary Examiner.*